(12) United States Patent
Whitney

(10) Patent No.: US 8,810,604 B2
(45) Date of Patent: Aug. 19, 2014

(54) SYSTEM AND METHOD FOR ACTIVATING, ACTIONING AND PROVIDING FEEDBACK ON INTERACTIVE OBJECTS WITHIN LINE OF SIGHT

(75) Inventor: Stephen Whitney, Monkstown (IE)

(73) Assignee: Mastercard International Incorporated, Purchase, NY (US)

( * ) Notice: Subject to any disclaimer, the term of this patent is extended or adjusted under 35 U.S.C. 154(b) by 164 days.

(21) Appl. No.: 13/526,898

(22) Filed: Jun. 19, 2012

(65) Prior Publication Data

US 2013/0335310 A1 Dec. 19, 2013

(51) Int. Cl.
G09G 5/00 (2006.01)
(52) U.S. Cl.
USPC ............................................ 345/661; 345/156
(58) Field of Classification Search
USPC .......................... 345/7–8, 156, 427, 633, 661
See application file for complete search history.

(56) References Cited

U.S. PATENT DOCUMENTS

| 5,870,136 A * | 2/1999 | Fuchs et al. ...................... 348/42 |
| 8,587,589 B2 * | 11/2013 | Collomb ........................ 345/427 |
| 2011/0175932 A1 * | 7/2011 | Yu et al. ......................... 345/661 |
| 2013/0050258 A1 * | 2/2013 | Liu et al. ........................ 345/633 |
| 2013/0328762 A1 * | 12/2013 | McCulloch et al. .......... 345/156 |

* cited by examiner

*Primary Examiner* — Claire X Pappas
*Assistant Examiner* — Abdul-Samad A Adediran
(74) *Attorney, Agent, or Firm* — Leason Ellis LLP

(57) ABSTRACT

Systems and methods are provided for line of sight, hands free interaction with interactive objects within a defined space on a line of sight basis. The system can include a base station in communication with one or more interactive objects having a variety of display options. Details about the display options are stored on the system along with the location of the interactive objects and layout of the surroundings of the interactive object. Users can carry devices that are in communication with the base station and that determine the user's location and head orientation and relay that information to the base station. Using the location and orientation of the user, the location of the interactive objects and the layout information about the surrounding area, the system can determine if the user is looking directly at an interactive object and can cause the interactive object to perform an action.

17 Claims, 5 Drawing Sheets

SYSTEM AND METHOD FOR ACTIVATING, ACTIONING AND PROVIDING FEEDBACK ON INTERACTIVE OBJECTS WITHIN LINE OF SIGHT

TECHNICAL FIELD OF THE INVENTION

This patent application relates to the field of augmented reality and, in particular, to remote activation and interaction with an interactive object on a line of sight basis.

BACKGROUND OF THE INVENTION

The continued growth of the Internet and Internet-connected wireless devices (e.g., smart phones) has greatly expanded the capabilities and ease of providing and consuming information. As users demand more information throughout their day-to-day lives, there is an increasing need to provide that information and to do so in a relatively seamless manner. Accordingly, it is desirable to be able to interact with an interactive object (e.g., an audio/visual display) so as to instigate some action by the interactive object or obtain information about the interactive object automatically by the simple gesture of looking at it. This way, a user is getting the information he or she seeks and gets it easily and on demand.

Location protocols alone, such as GPS or Wi-Fi positioning, provide the location of a user with a high degree of accuracy; however, they do not provide user orientation, that is, the direction the user is facing, or what the user is looking at. Using these location based systems, performing activation of an interactive object can only be based on proximity of the user to the interactive object. In situations where the user is not looking at the interactive object, performing activation may not required or desired. Should the user have his or her back turned to the interactive object it is not of interest to the user at that moment. Proximity can also be misleading; a user can be very close to a point of interest but completely disconnected from the POI, for example, separated by a wall.

Augmented reality applications are limited in their ability to activate a point of interest, and only relay information to a device based on its location and orientation. The typical augmented reality application overlays a visual representation of the information on top a video feed from the device's video camera and a user can interact with the augmented reality rendering. These systems require the user to point the camera of the device directly at a point of interest, require a camera on the device, and require the device to be capable of presenting the video feed and the related information.

Accordingly, it is desirable to activate, provide information, and/or interact with an interactive object automatically by visually defined gestures such as looking at it or pointing it out. It is with respect to these and other considerations that the disclosure made herein is presented.

SUMMARY OF THE INVENTION

Technologies are presented herein in support of a system and method for remotely activating and interacting with an interactive object on a line of sight basis. According to a first aspect, a system for line of sight, hands-free interaction with one or more interactive objects within a defined space on a line of sight basis is provided. The system includes a plurality of modules comprising instructions executing in a processor and configuring the processor. The modules include: a user-interest module configured to receive at least a user location and a user orientation which define user-interest information; an object-monitoring module configured to receive a location of a particular interactive object and an activity state of the particular interactive object; a map module configured to store a layout of the defined space; a line-of-sight module configured to compute a line of sight of the user at a moment in time using the user interest information; an analysis module configured to determine whether the location of the particular interactive object is unobstructed by the defined space and intersects with the line-of-sight of the user; and an activation module configured to output a signal to the particular interactive object, the output signal is configured to transition the interactive object from a first state to a second state in response to the unobstructed intersection of the user line of sight with the particular object location for a defined amount of time.

According to another aspect, a method for activating one or more interactive objects within a defined space on a line of sight basis, is provided, comprising: receiving at least a user location and a user orientation which defines the user interest information at a device having a processor; receiving a location of a particular interactive object and activity state of the particular interactive object at the device; receiving and storing in a memory of the device a layout of a defined space; computing a line-of-sight of a user at a moment in time using the processor of the device configured to operate upon the user interest information; determining with the processor whether the location of the particular interactive object intersects with the line-of-sight of the user and is unobstructed by the defined space; and outputting a signal with the processor to the particular interactive object. As noted above, the signal is configured to transition the interactive object from a first state to a second state in response to the unobstructed intersection of the user line of sight with the particular interactive object location for a defined amount of time.

These and other aspects, features, and advantages can be appreciated from the accompanying description of certain embodiments of the invention and the accompanying drawing figures and claims.

DETAILED DESCRIPTION OF CERTAIN EMBODIMENTS OF THE INVENTION

Figure 1:
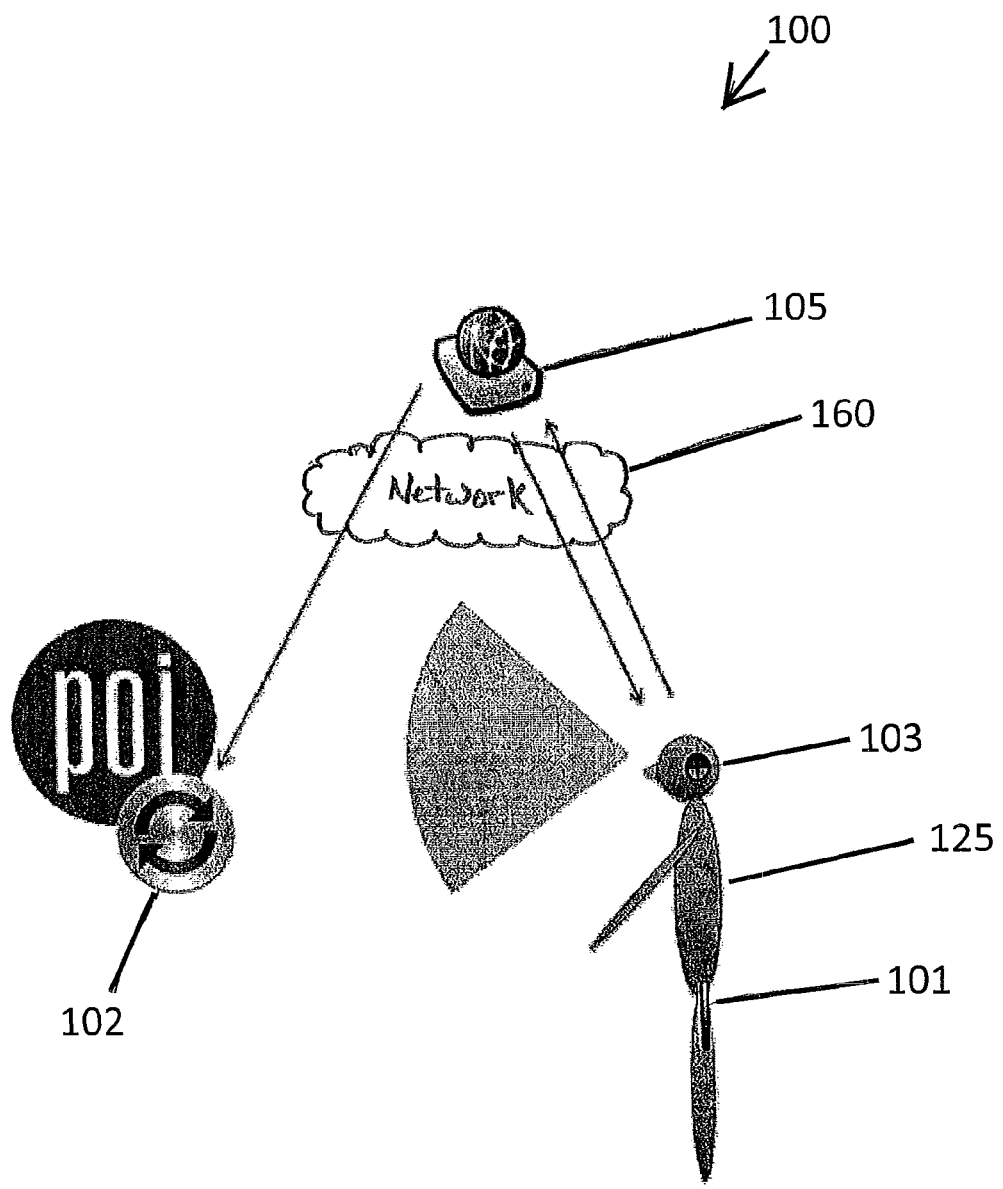
FIG. 1 is a high-level conceptual diagram illustrating an exemplary configuration of a system for activating interactive objects on a line of sight basis.

By way of overview and introduction, various systems and methods are described herein that facilitate and enable user interaction with an interactive object on a line of sight basis. It can be appreciated that there is a demand for targeted sharing and consumption of information on points of interest with minimal user interaction. Accordingly, it is desirable to activate an interactive object and/or provide information regarding the object, and/or interact with the interactive object automatically by merely looking at it or pointing it out.

It is also desirable from the operator of the interactive object's standpoint to provide information efficiently, (i.e., only when necessary or when a user is receptive to the information) and target the information to a particular user to make the transfer of information as effective as possible. The system has a base station computing device that is in communication with one or more interactive objects. The interactive objects have a variety of display options and the details about the display options are stored on the system. In addition, the location of the interactive objects and a layout of the surroundings of the interactive objects are stored on the system. Users carry around devices configured in accordance with the invention described herein and that are in communication with the base station such as a smart phone and a head-mounted 3D accelerometer. These devices can determine the user's location and head orientation and relay that information to the base station. Using data that is provided and/or determined about the location and orientation of the user, the location of the interactive objects and the layout information concerning the surrounding area is used by the system to determine if the user is looking directly at an interactive object. If the user is looking at the interactive object for a set amount of time, as determined by the system, the system causes the interactive object to perform an action such as display information for the user.

The following detailed description is directed to systems and methods for facilitating line of sight, hands free interaction with one or more interactive objects within a defined space on a line of sight basis. The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

FIG. 1 is a high-level conceptual diagram illustrating an exemplary configuration of a line of sight interaction system 100. The system 100 comprises a base station 105, at least one interactive object including a particular interactive object 102, a user device 101, and a user orientation device 103.

The user device 101 determines the location of a user 125 and communicates information about the user 125 to the base station 105. The user device 101 can be any device configured to detect the location of the user 125 and transmit the location information to the base station 105, such as a GPS device or a mobile phone, a PDA, a smart phone equipped with a GPS device, a cellular positioning device or wifi positioning device. The user device 101 is in bi-directional communication with the base station 105 and is configured to not only transmit information to the base station 105, but to also receive information from the base station 105 concerning use of the line of sight interaction system 100. The user device 101 preferably transmits a user identifier that is unique to the user 125 and/or the user device 101 to the base station 105 so that the base station can distinguish among multiple users, if present.

The user device 101 is also in communication with a user orientation device 103. The user orientation device 103 detects where the user 125 is looking, to provide user orientation information, in one or more dimensions (i.e., azimuth and/or elevation). The user orientation device 103 can be, by example and without limitation, a portable computing device equipped with a three-dimensional (3D) accelerometer, a compass, or a gyroscope. By way of further example, user orientation device 103 can be a head-mounted 3D accelerometer equipped device such as the Sensixa® e-Air device of Hong Kong, Lumus® OE-31 optical engine of Rehovot, Israel, Sony Ericsson® MH907 headphones of Sony Corporation or head mounted Android® device.

User orientation information is collected by the user orientation device 103 and can be transmitted directly to the base station 105 but is expected to be transmitted to the user device 101, processed by the user device such as by a module executing therein which is responsive to receipt of orientation information and configured to transmit it, together with other information (e.g., the user identifier) to the base station 105.

In an alternative arrangement, the user orientation device 103 comprises a hand-held device such as a pointer that the user 125 manually points at the particular interactive object 102. More generally, user device 101 and the user orientation device 103 do not need to be two distinct devices and can be combined into a single device. For example, the user device 101 can be a smart phone equipped with GPS locator functionality as well as a compass, gyroscope and/or 3D accelerometer and having modules suitable for implementing an embodiment of the invention. The user 125 points the smart phone (i.e., the combination user device 101 and user orientation device 103) at the particular interactive object 102 and the smart phone can detect where it is located, direction it is being pointed, and its angle of elevation.

The user orientation information and the user location information constitutes user interest information that can be processed by the base station 105 as further described herein.

The particular interactive object 102 is in communication with the base station 105 though in some arraignments the object 102 and base station 105 can be integrated. The particular interactive object 102 can include a computing system with an audio and/or visual display that projects information. For example, the particular interactive object 102 can be an electronic sign for a restaurant or an informational display positioned next to a painting in a museum. It should be understood that the particular interactive object 102 does not need to accompany a point of interest because the particular interactive object 102 could be the point of interest itself, such as a stand-alone sign along a roadway.

The particular interactive object 102 can be any computing device and/or processing apparatus capable of embodying the systems and/or methods described herein, including but not limited to, an audio/visual display unit, an electronic sign, a personal computer, tablet computer, or television. The particular interactive object 102 includes an output device such as an audio/visual display, as well as a processor and a memory to store computer program code including an activation daemon. The activation daemon can be a continuously executing background application that configures the particular interactive object's processor to control the one or more activity states of the audio/visual display. The particular interactive object 102 can also include a location device, such as a GPS device, wifi positioning device or cellular positioning device to detect its location or its location can be otherwise programmed or recorded by the base station 105 (e.g., as a location in a room, etc.). The particular interactive object 102 includes a communication interface to transmit and/or receive information to/from other devices including, but not limited to, the base station 105.

By example, the particular interactive object 102 can be a sign to promote an Italian restaurant that includes a digital display with a variety of visual display options. The first activity state of the visual display can show the name of the restaurant, the second activity state can show the complete menu of the restaurant, and a third activity state can show the vegetarian menu. The particular interactive object's processor executing the activation daemon program controls the state of the display and can switch the display between the three possible activity states. Furthermore, the base station 105 communicates with the particular interactive object 102 and transmits instructions prompting the particular interactive object's processor to switch the state of the display as discussed herein. Alternatively, more of the processing can be at the base station than at the interactive object, with commands issuing from the base to the interactive object.

Figure 2:
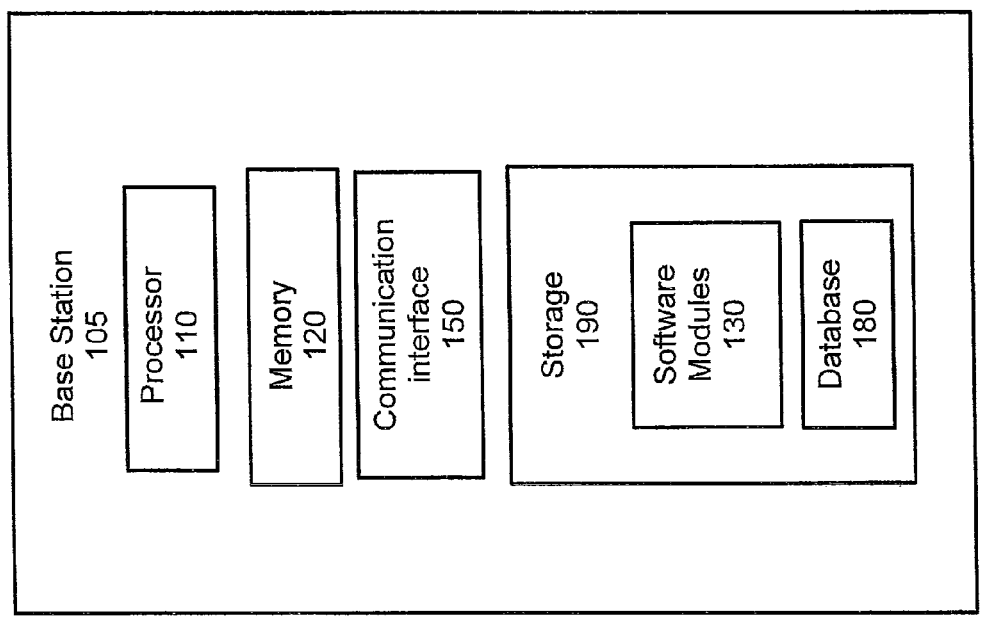
FIG. 2 is a block diagram showing an exemplary configuration of a system for activating interactive objects on a line of sight basis.

The base station 105 is a computing device that is configured to connect to and receive information from the user device 101 and/or the user orientation device 103 and activate the particular interactive object 102 accordingly. It should be understood that the base station 105 of the line of sight interaction system 100 can be practically any computing device and/or data processing apparatus capable of embodying the systems and/or methods described herein. In reference to FIG. 2, the base station 105 of the line of sight interaction system 100 includes various hardware and software components that serve to enable operation of the line of sight interaction system 100 including a processor 110, memory 120, storage 190 and a communication interface 150. Processor 110 serves to execute software instructions that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages. The program code can execute entirely on the base station 105, partly on the base station 105, as a stand-alone software package, partly on the base station 105 and partly on a remote computer/device such as the particular interactive object 102 and/or the user device 101, or entirely on the remote computer/device. In the latter scenario, the remote computer can be connected to the base station 105 through any type of network, including a local area network (LAN) or a wide area network (WAN), or the connection can be made to an external computer (for example, through the Internet using an Internet Service Provider).

Preferably, included among the software modules 130 are at least a user-interest module, an object-monitoring module, a map module, a line-of-sight module, an analysis module, an activation module, a user-preference module and a state-selection module 177 that are executed by processor 110. During execution of the software modules 130, the processor 110 configures the base station 105 to perform various operations relating to the remote activation and interaction with an interactive object, as will be described in greater detail below.

It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It should be understood that in some illustrative embodiments, one or more of software modules 130 can be downloaded over a network to storage 190 from another device or system via communication interface 150 for use within line of sight interaction system 100. In addition, it should be noted that other information and/or data relevant to the operation of the present systems and methods (such as database 180) can also be stored on storage 190, as will be discussed in greater detail below.

Also preferably stored on storage 190 is database 180. Database 180 can contain and/or maintain various data items and elements that are utilized throughout the various operations of line of sight interaction system 100. The information stored in database 180 can include but is not limited to, user information unique to a user (i.e., user 125), interactive object information unique to one or more interactive objects including the particular interactive object 102. It should be noted that although database 180 is depicted as being configured locally to the base station 105, in certain implementations database 180 and/or various of the data elements stored therein can be located remotely (such as on a remote device or server—not shown) and connected to the base station 105 through a network in a manner known to those of ordinary skill in the art.

Communication interface 150 is also operatively connected to the processor 110 and can be any interface that enables communication between the base station 105 and external devices, machines and/or elements including the user device 101, and the particular interactive object 102. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting the base station 105 to other computing devices and/or communication networks such as private networks and the Internet. Such connections can include a wired connection or a wireless connection (e.g., using the 802.11 standard) though it should be understood that communication interface 150 can be practically any interface that enables communication to/from the base station 105.

At various points during the operation of line of sight interaction system 100, the base station 105 can communicate with one or more computing devices, such as the particular interactive object 102 and the user device 101, each of which will be described in greater detail herein. Such computing devices transmit and/or receive data to/from the base station 105, thereby preferably initiating maintaining, and/or enhancing the operation of the line of sight interaction system 100, as will be described in greater detail below.

It should be understood that the particular interactive object 102, the user device 101 and the user orientation device 103 can be in direct communication with the base station 105, indirect communication with the base station 105, can be coordinated through a computer network 160 such as the Internet.

It should be noted that while FIG. 1 depicts the line of sight interaction system 100 with respect to one particular interactive object 102, the user device 101, the user orientation device 103 and the base station 105, it should be understood that any number of interactive objects, user devices, user orientation devices and base stations can interact with the line of sight interaction system 100 in the manner described herein. It should also be noted that while FIG. 1 depicts line of sight interaction system with respect to one user 125, it should be understood that any number of users can interact with the line of sight interaction system 100 in the manner described herein. It should be further understood that a substantial number of the operations described herein are initiated by and/or performed in relation to such computing devices. For example, as referenced above, such computing devices can execute applications and/or viewers which request and/or receive data from the base station 105, substantially in the manner described in detail herein.

It should be further understood that while the various computing devices and machines referenced herein, including but not limited to, the base station 105, the particular interactive object 102, and the user device 101 and the user orientation device 103 are referred to herein as individual/single devices and/or machines, in certain implementations the referenced devices and machines, and their associated and/or accompanying operations, features, and/or functionalities can be arranged or otherwise employed across any number of devices and/or machines, such as over a network connection, as is known to those of skill in the art.

Figure 3:
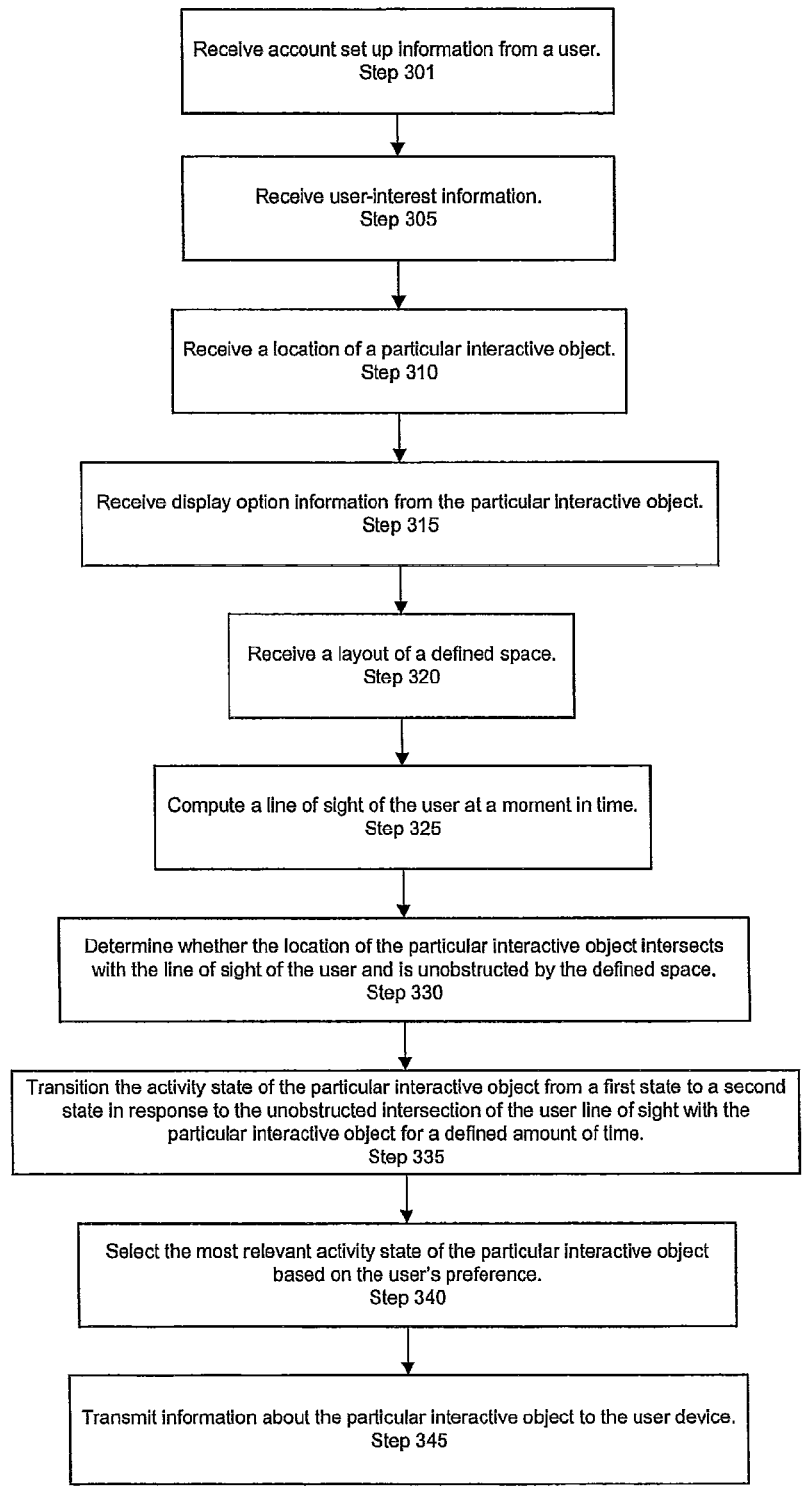
FIG. 3 is a flow diagram showing a routine that illustrates a broad aspect of a method for managing interaction with an interactive object, according to at least one embodiment disclosed herein.

The operation of the line of sight interaction system 100 and the various elements and components described above will be further appreciated with reference to the method for activating and interactions with an interactive object in conjunction with FIG. 3.

Turning now to FIG. 3, a flow diagram illustrates a routine 300 for interacting with a particular interactive object 102 within a defined space in accordance with at least one embodiment disclosed herein. It should be appreciated that several of the logical operations described herein are implemented (1) as a sequence of computer implemented acts or program modules running on the line of sight interaction system 100 and/or (2) as interconnected machine logic circuits or circuit modules within the line of sight interaction system 100. The implementation is a matter of choice dependent on the requirements of the device (e.g., size, energy, consumption, performance, etc.). Accordingly, the logical operations described herein are referred to variously as operations, steps, structural devices, acts, or modules. As referenced above, various of these operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step 301, where processor 110 executing one or more of software modules 130, including, set-up module 178 and user-preference module 176, configures the base station 105 to receive account set up information from the user 125 wishing to use the line of sight interaction system 100. This set-up module generates an account for the user 125 and stores the account information on database 180. The user 125 using a computing device such as the user device 101 can connect to the base station 105 and can provide information specific to the user 125 to the base station 105. At a minimum, user information includes a user identifier that is unique to the user 125 and/or the user device 101 that is being used to connect to the base station 105. Further information can be provided by the user 125 to the base station 105 such as the user's name, age, hometown and other personal preferences, such as dietary habits, interests, hobbies, etc. to create a user profile. The base station 105 can associate the unique user identifier with a user profile and store this information in the database 180.

Thereafter, or at a completely different time, at step 305, processor 110 executing one or more software modules 130, including, user interest module 170, configures the base station 105 to receive user-interest information. User interest information can be collected and transmitted by the user device 101 and includes the user's location and the user's orientation and a user identifier. User location can be detected by the user device 101 which is carried by the user 125 such as a smart phone with an on board GPS locator. The user orientation information can be detected by the user orientation device 103, such as a head-mounted 3D accelerometer, that detects the direction and elevation of where the user 125 is looking. Alternatively the user orientation device 103 can be a pointer that a user can carry and point at the particular interactive object 102. The user device 101 also transmits the user identifier to the base station 105 so that the base station 105 can identify the user 125. As will be appreciated, step 305 can be implemented simply as a function of the user carrying out normal activities, but changing his or her location or orientation.

At step 310, processor 110 executing one or more of software modules 130, including, preferably object monitoring module 170, configures the base station 105 to receive a location of a particular interactive object 102. For example, the particular interactive object 102 can include an on board GPS device to detect its location and can transmit this location information to the base station 105. Alternatively, the location of the particular interactive object 102 can be obtained by an individual installing the interactive object and then provide the location to the base station 105.

At step 315, processor 110 executing one or more of software modules 130, including, preferably object monitoring module 170, configures the base station 105 to receive display option information from the particular interactive object 102. As discussed above, the particular interactive object 102 is capable of displaying one or more activity states. The particular interactive object 102 transmits information about the possible activity states to the base station 105. In addition, the particular interactive object's 102 can also transmit information about what activity state is being displayed at that point in time. Processor 110 of the base station 105 can be further configured by object monitoring module 170 to continuously monitor the activity state of the particular interactive object 102 and also maintain a record of the variety of possible display states and store this information on storage 190.

At step 320, processor 110 executing one or more of software modules 130, including, preferably map module 172, configures base station 105 to receive a layout of a defined space. The layout of the defined space can include a map of the bounds, dimensions of the area, the location of obstructing objects and their dimensions within the area, for example, walls or buildings. The layout can also include the position and dimensions of any interactive object or point of interest within the area. It should be noted that if the layout of the defined space includes the position and dimension of an interactive object within the defined space, there is no need to include a location device as part of the interactive object 102 or to communicate the interactive object's location information to the base station 105, and, as such, step 310 is optional in some arrangements. The base station 105 can also be configured to store the layout of the defined space on storage 190.

Figure 4:
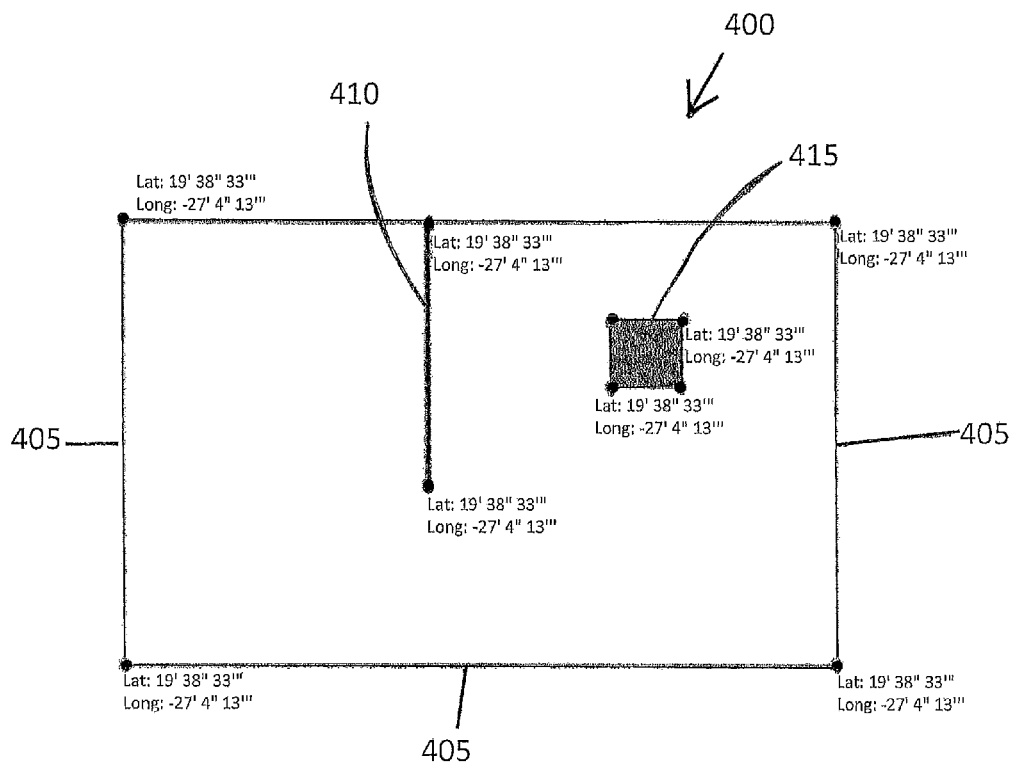
FIG. 4 depicts a screenshot of an exemplary layout of a defined space in accordance with at least one embodiment disclosed herein.
Figure 5:
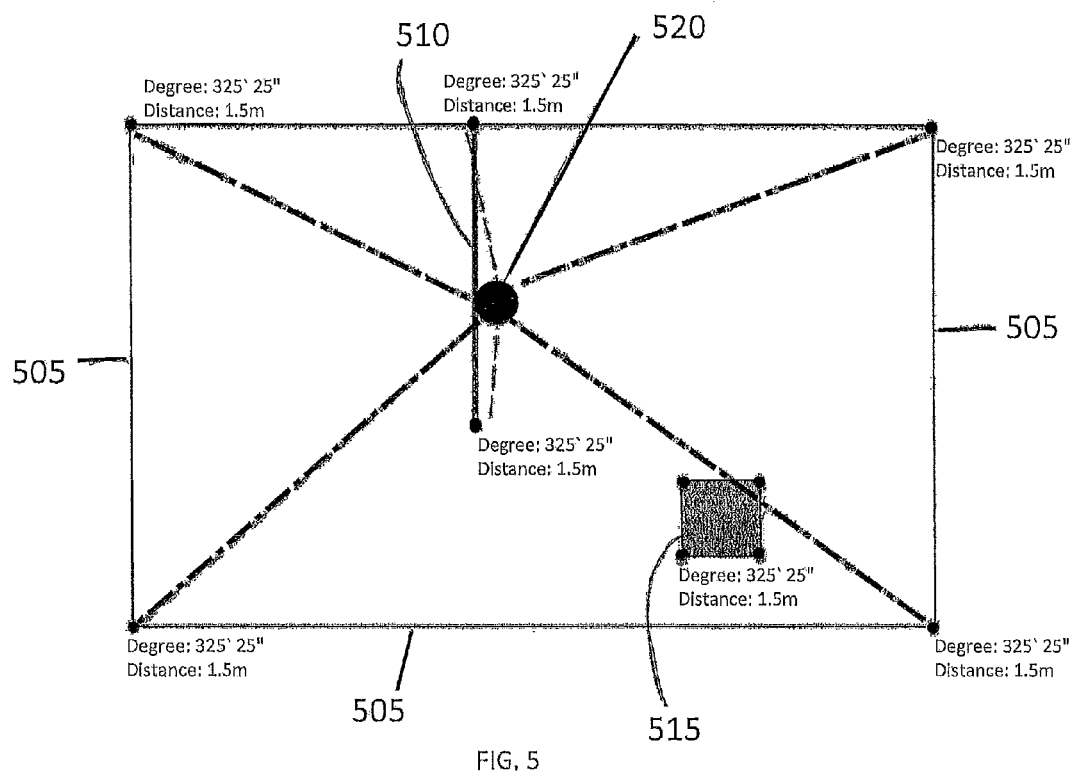
FIG. 5 depicts a screenshot of an exemplary layout of a defined space in accordance with at least one embodiment disclosed herein.

The layout of the defined space can be mapped using absolute coordinates such as GPS coordinates or can be mapped relative to a known base point using planar offset vectors. For example, FIG. 4 shows an exemplary layout of a defined space 400 in absolute GPS coordinates. The defined space 400 includes four outer walls 405 connected to form a square with the coordinates of the four wall end points mapped. The defined space 400 also includes an interior wall 410 with its end points mapped. The defined space 400 also includes an interactive object 415 with its four corners mapped. FIG. 5 shows an exemplary layout of a defined space 500 mapped in planar offset vectors from a base station 520 placed inside the defined space 500. The defined space 500 includes four outer walls 505 connected to form a square with the coordinates of the four wall end points mapped relative to the base station 520. The defined space 500 also includes an interior wall 510 with its end points mapped relative to the base station 520. The defined space 500 also includes an interactive object 515 with its four corners mapped relative to the base station 520.

Returning to FIG. 3 at step 325, processor 110 executing one or more of software modules 130, including, preferably line of sight module 173, configures the base station 105 to compute a line of sight of the user 125 at a given moment in time from the user-interest information. Using the location of the user device 101 and the orientation of the user orientation device 103, the base station 105 can mathematically calculate the starting point and vector of the user's line of sight.

At step 330, processor 110 executing one or more of software modules 130, including, preferably analysis module 174, configures base station 105 to determine whether the location of the particular interactive object 102 intersects with the line of sight of the user 125 and is unobstructed by the defined space. From the user's location information as provided by user device 101, the base station 105 can determine whether the user 125 is within a defined space that is known to the base station 105 and plot the user's location within the defined space. The base station 105 can also determine whether there are any interactive objects within the defined space and determine if the line of sight vector intersects with the location of the interactive object. The base station 105 can also determine whether there are any obstructing objects, such as walls, between the user 125 and the particular interactive object 102. In determining whether an interactive object 102 intersects with the line of sight vector, the sensitivity of the calculation by the base station can be adjusted such that a point of interest within a pre-defined distance from the calculated line of sight vector will result in the system finding that the line of sight vector intersects with a particular interactive object 102.

At step 335, processor 110 executing one or more of software modules 130, including, preferably activation module 176, configures the base station 105 to transition the activity state of the particular interactive object 102 from a first state to a second state in response to the unobstructed intersection of the user line of sight with the particular interactive object 102 as determined in step 330 for a defined amount of time. By way of example, the first activity state of the display can be the state of the display at that point in time. The second state of the display can be a randomly chosen activity state or an activity state that the base station 105 determined was most appropriate to be displayed to user 125 as further described herein.

At step 340, processor 110 executing one or more of software modules 130, including, preferably state-selection module 177, configures the base station 105 to select the most relevant activity state of the interactive object based on the user's 125 preferences. Any number of algorithms can be implemented to determine the most appropriate activity state to display to the user 125. For example, processor 110 executing user-preference module 176 can configure the base station 105 to maintain a history of user's 125 interactions with various interactive objects that are part of the line of sight interaction system 100. Since information about the various interactive objects are stored on storage 180 and can be categorized by topic, (i.e., food, art, music, electronics. etc.). A history of interactions by the user 125 has can be interpreted by the base station 105 to generate an understanding of the user's 125 preferences. Knowledge of the user's 125 preferences from the user's 125 profile and/or prior activity can be used by code executing in the base station 105 to tailor the information the line of sight interaction system 100 displays for the user 125. For example, if the user's profile states that the user 125 is a vegetarian, when the user 125 approaches the particular interactive object 102 that is associated with a restaurant, the base station 105 can respond to the preferences stored by that user to cause the particular interactive object 102 to display the vegetarian menu instead of the full menu. By way of further example, if the user 125 has historically interacted with interactive objects that are related to art, the base station 105 can cause more in depth information to be displayed to the user 125 the next time the user looks at an interactive object associated with art. A casual user who does not have a history of interest in art, may by default be shown a less detailed display of information.

In an alternative scenario, multiple users can be looking at the same particular interactive object 102. In this case, the base station 105 can be configured to transition the particular interactive object 102 to display an activity state that corresponds to a common interest of each user looking at the interactive object 102. Alternatively, when the particular interactive object 102 is within the line of sight of multiple users the base station may only activate the particular interactive object 102 for the nearest user. The base station 105 could also include the position a users as an obstruction to another user's line of sight.

Then at step 345, processor 110 executing one or more software modules 130 configures the base station 105 to transmit information about the particular interactive object 102 to the user device 101. If the user device 101 is capable of displaying information, such as a smart phone, the user device 101 can display this information to the user 125 similar to how one might consume information over the internet or through an augmented reality system. The base station 105 can also be configured to receive input from the user 125 using the user device 101 and display information in response to the user input. The information can be displayed via the particular interactive object 102 or the user device 101. By example, the particular interactive object 102 is an informational display next to an art installation. The user 125 can activate the particular interactive object 102 in the manner described above. In addition to changing the state of the particular interactive object 102 in response to the user activation, the base station 105 can transmit further information about the art installation to the user device 101. The user device 101 can display this supplemental information to user 125 along with options for further information that are selectable by the user 125 using the user device 101. The user device 101 receives the user's selection and transmits that selection to the base station 105. In response to the user's selection, the base station can display further information on the interactive object 102 and/or user device 101.

It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide systems and methods for remotely activating and interacting with an interactive object on a line of sight basis. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting.

Various modifications and changes can be made to the subject matter described herein without following the example embodiments and applications illustrated and described, and without departing from the true spirit and scope of the present invention, which is set forth in the following claims.

What is claimed is:

1. A system for line of sight, hands free interaction with one or more remote interactive output devices within a defined space on a line of sight basis, wherein the defined space has a layout, comprising:
    a processor;
    a memory;
    a communication interface;
    a plurality of modules comprising instructions stored in the memory and executing in the processor to configure the processor, including:
    a user-interest module that when executed by the processor configures the processor to receive at least a user location and a user orientation which define user-interest information, wherein the user interest information is received from a remote user device associated with a user;
    an object-monitoring module that when executed by the processor configures the processor to receive a location of a particular interactive output device and an activity state of the particular interactive output device, wherein the particular interactive output device is remotely located and is configured to interact with the system and actively output information;
    a line-of-sight module that when executed by the processor configures the processor to compute a line of sight of the user at a moment in time using the user interest information;
    an analysis module that when executed by the processor configures the processor to determine, based on the layout and the line of sight, whether the location of the particular interactive output device is unobstructed by the defined space and intersects with the line-of-sight of the user; and
    an activation module that when executed by the processor configures the processor to output a signal to the particular interactive output device, the signal being configured to transition the particular interactive output device from a first state to a second state in response to a hands free interaction between the user and the particular interactive output device, wherein the hands free interaction is the unobstructed intersection of the user line of sight with the particular output device location for a defined amount of time.

2. The system of claim 1, wherein the particular interactive output device includes a processor running an activation daemon that controls one or more states of activity on the interactive output device.

3. The system of claim 1, wherein the object-monitoring module configures the processor to maintain a record of all possible states of activity for the particular interactive output device.

4. The system of claim 1, further comprising a user-preference module that when executed by the processor configures the processor to receive and store preferences of the user.

5. The system of claim 1, further comprising a state-selection module that when executed by the processor configures the processor to determine a most relevant activity state of the interactive output device based on the particular user's preferences.

6. The system of claim 1, wherein the user location is provided by a mobile device.

7. The system of claim 1, wherein the user orientation is provided by a mobile device.

8. The system of claim 1, wherein the user orientation is provided by a head mounted 3D accelerometer-equipped device.

9. The system of claim 1, further comprising an augmented-reality module that when executed by the processor configures the processor to transmit audible or visible information about the interactive output device to the user.

10. The system of claim 1, wherein the defined space is mapped to include obstructing objects within the space.

11. The system of claim 1, wherein the defined space is mapped and stored using GPS coordinates.

12. The system of claim 1, wherein the defined space is mapped and stored using planar offset vectors from a known base point.

13. A computer-implemented method for activating one or more remote interactive output devices within a defined space on a line of sight basis,
wherein the defined space has a layout, comprising:
receiving at least a user location and a user orientation which defines user interest information at a device having a processor, wherein the user interest information is received from a remote user device;
receiving a location of a particular interactive output device and activity state of the particular interactive output device at the device, wherein the particular interactive output device is remotely located and is configured to interact with the system and actively output information;
computing a line-of-sight of a user at a moment in time using the processor of the device configured to operate upon the user interest information;
determining with the processor, based on the layout and the line-of-sight, whether the location of the particular interactive output device intersects with the line-of-sight of the user and is unobstructed by the defined space;
outputting a signal with the processor over a communication network to the particular interactive output device, the signal being configured to transition the interactive output device from a first state to a second state in response to the unobstructed intersection of the user line of sight with the particular output device location for a defined amount of time.

14. The method of claim 13, further comprising maintaining a record in the memory of the device of all possible states of activity for the particular interactive output device.

15. The method of claim 13, further comprising receiving preferences from the particular user.

16. The method of claim 13, further comprising determining with the processor a most relevant activity state of the interactive output device based on the particular user's preferences.

17. The method of claim 13, further comprising transmitting information with the processor to the particular user about the interactive output device.

* * * * *